United States Patent
Raman et al.

(10) Patent No.: US 8,825,512 B2
(45) Date of Patent: Sep. 2, 2014

(54) PERSISTENT NETWORK-BASED ELECTRONIC TRANSACTION SERVICES

(75) Inventors: Madhusudan Raman, Sherborn, MA (US); Renu Chipalkatti, Lexington, MA (US); Jeffrey M. Getchius, Cambridge, MA (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 288 days.

(21) Appl. No.: 13/206,653

(22) Filed: Aug. 10, 2011

(65) Prior Publication Data

US 2013/0041770 A1 Feb. 14, 2013

(51) Int. Cl.
*G06Q 10/00* (2012.01)
*G06Q 30/00* (2012.01)
*G06G 1/12* (2006.01)
*G06Q 20/00* (2012.01)

(52) U.S. Cl.
USPC ............................. 705/7.26; 705/14.4; 705/21

(58) Field of Classification Search
USPC .......................................... 705/21, 14.4, 7.26
See application file for complete search history.

(56) References Cited

U.S. PATENT DOCUMENTS

| | | | | |
|---|---|---|---|---|
| 7,292,996 | B2 * | 11/2007 | Nobrega et al. | 705/39 |
| 7,447,662 | B2 * | 11/2008 | Gibson | 705/75 |
| 2002/0107791 | A1 * | 8/2002 | Nobrega et al. | 705/39 |
| 2002/0111919 | A1 * | 8/2002 | Weller et al. | 705/67 |
| 2002/0194138 | A1 * | 12/2002 | Dominguez et al. | 705/64 |
| 2003/0140007 | A1 * | 7/2003 | Kramer et al. | 705/40 |
| 2004/0107170 | A1 * | 6/2004 | Labrou et al. | 705/64 |
| 2005/0246278 | A1 * | 11/2005 | Gerber et al. | 705/44 |
| 2006/0006226 | A1 * | 1/2006 | Fitzgerald et al. | 235/380 |
| 2006/0149671 | A1 * | 7/2006 | Nix et al. | 705/40 |
| 2007/0011099 | A1 * | 1/2007 | Sheehan | 705/65 |
| 2009/0327133 | A1 * | 12/2009 | Aharoni et al. | 705/44 |
| 2010/0030697 | A1 * | 2/2010 | Goodrich et al. | 705/75 |
| 2010/0057621 | A1 * | 3/2010 | Faith et al. | 705/71 |
| 2010/0121701 | A1 * | 5/2010 | Nguyen et al. | 705/14.38 |

OTHER PUBLICATIONS

Object Management Group, Inc., *Business Process Model and Notation (BPMN)*, Jan. 3, 2011, Version 2.0, pp. 1-538.
Oasis, *Web Services Business Process Execution Language*, Apr. 11, 2007, Version 2.0, wsbpel-v2.0-OS, pp. 1-264.

* cited by examiner

*Primary Examiner* — Seye Iwarere

(57) ABSTRACT

A system configured to receive a request to perform an electronic transaction associated with merchant equipment, where the request identifies one or more value-added services that are to be provided when the transaction is performed; retrieve workflow information, associated with a workflow that corresponds to the transaction, where the workflow information identifies how the transaction is to be performed and how the value-added services are to be provided; obtain information associated with one or more second server devices that provide the value-added services; instruct the second server devices to provide the value-added services, in a manner that conforms to the workflow information, based on the information associated with the one or more second server devices; perform the transaction in a manner that conforms to the workflow information; and transmit, to the merchant equipment, a notification that the transaction has been performed or that the value-added services have been provided.

22 Claims, 8 Drawing Sheets

US 8,825,512 B2

PERSISTENT NETWORK-BASED ELECTRONIC TRANSACTION SERVICES

BACKGROUND

Electronic sales transactions have proliferated in recent years and now account for a significant portion of all sales transactions. More and more electronic sales transactions are being performed by user devices, such as digital vending machines, electronic registers at a merchant premises, wireless vending modules, wireless handheld devices, etc. The user devices may perform the electronic sales transactions (e.g., such as electronic point of sale transactions and/or other electronic transactions) by receiving payment information (e.g., such as credit card information, debit card information, an expiration date, a billing address, etc.) from a purchaser and communicating with a financial institution (e.g., a bank, a credit union, a credit card processor, etc.) to process the payment information.

The user devices usually include an application programming interface (API) that allows software to be developed for and/or an application to be integrated into the user devices. The software and/or application may allow the user devices to perform the electronic transaction. The user devices may not always detect fraudulent payment information and/or may transmit the fraudulent payment information to a financial institution to be processed. This may cause a merchant owner of the user device to experience loss of inventory and/or financial resources.

DETAILED DESCRIPTION OF PREFERRED EMBODIMENTS

The following detailed description refers to the accompanying drawings. The same reference numbers in different drawings may identify the same or similar elements.

A system and/or method, described herein, may enable a workflow, associated with an electronic transaction (e.g., such as an electronic point of sale transaction associated with a merchant), to be established by a financial server associated with a financial institution (e.g., a bank, a credit union, an entity that processes payment information, etc.). The term electronic transaction, as used herein, is to be interpreted broadly and may include an electronic transaction associated with a sale of a good and/or service, a rental and/or subscription of a good and/or service, an exchange of a good and/or service, a refund associated with a good/or service, a transfer of funds, a transaction associated with financial instruments, etc.

The workflow may identify a variety of functions to be performed when executing the electronic transaction and/or may identify one or more value-added services to be provided when selected by a merchant. The value-added services may include encrypting and/or decrypting information associated with the electronic transaction, detecting fraud with respect to payment information, collecting metrics associated with the electronic transaction, managing promotions and/or incentives, managing inventory, managing advertising, etc.

The system and/or method may allow an electronic transaction service (hereinafter referred to as "transaction service") to be provisioned, as a service (e.g., a cloud-based service, a web service, a network-based service, etc.) to user equipment associated with a merchant (hereinafter referred to as "merchant equipment"). The system and/or method may allow the merchant equipment to communicate with a transaction server device (e.g., via a web page, etc.) to access the service which allows the merchant equipment to initiate the electronic transaction. The system and/or method may allow the merchant equipment and/or an operator of the merchant equipment to provide payment information and/or to specify one or more value-added services to be provided when the electronic transaction is performed.

The system and/or method may allow a workflow server to obtain information associated with the workflow and/or to execute the workflow to process the payment information. The system and/or method may allow the workflow server to communicate with one or more value-added service (VAS) server devices to provide the value-added services that were specified by the operator of the merchant user device. The system and/or method may allow the transaction service and/or value-added services to be provided to the merchant equipment without performing software development for and/or software integration into the merchant equipment, and/or without causing the merchant equipment to be replaced.

Figure 1:
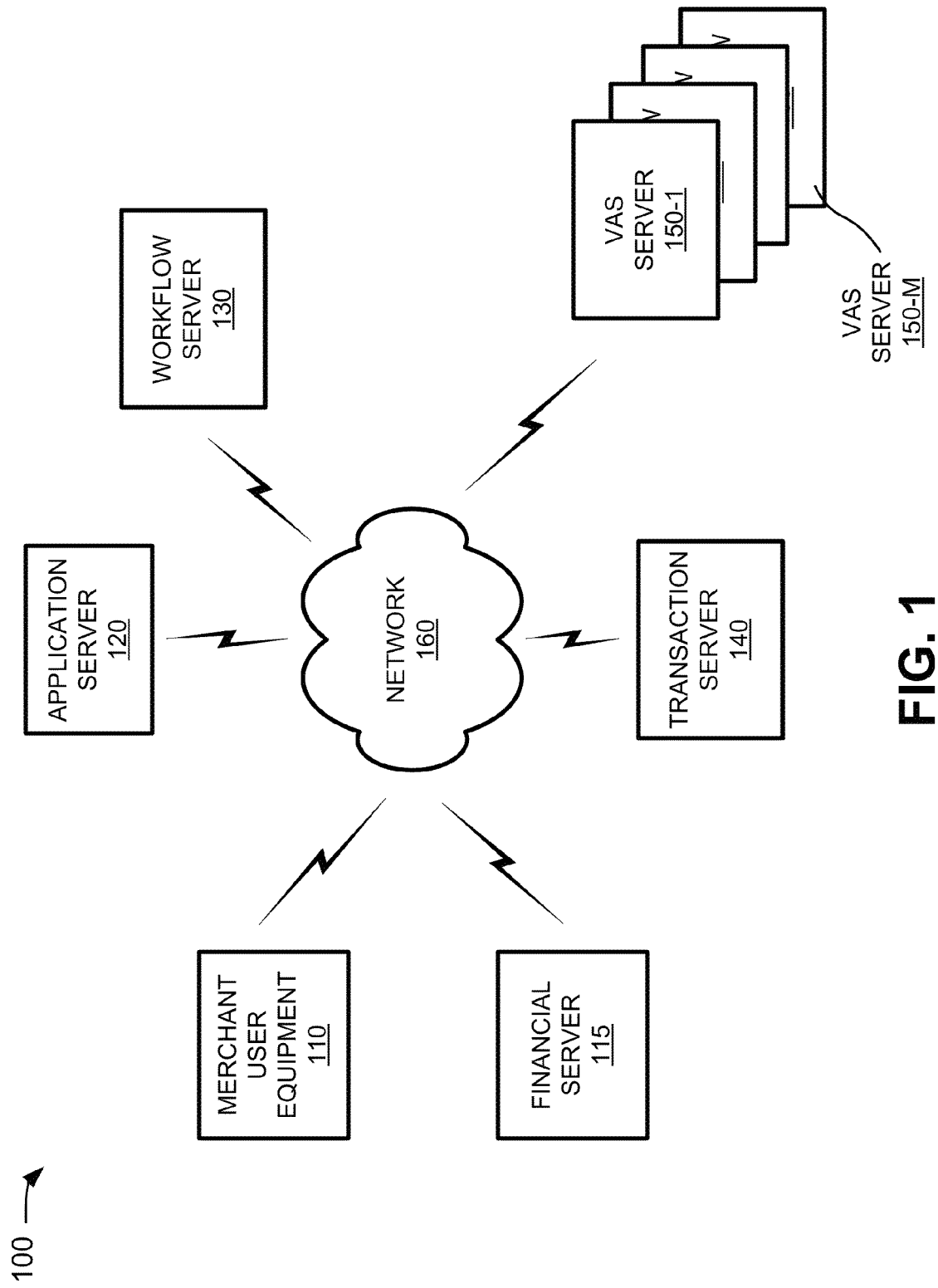
FIG. 1 is a diagram of an example environment in which a system and/or method described herein may be implemented.

FIG. 1 is a diagram of an example environment 100 in which systems and/or methods described herein may be implemented. As shown in FIG. 1, environment 100 may include merchant user equipment 110 (hereinafter referred to as "merchant equipment 110"), a financial server 115, an application server 120, a workflow server 130, a transaction server 140, a group of value-added services (VAS) servers 150-1, . . . , 150-M (where M≥1) (hereinafter collectively referred to as "VAS servers 150" and individually as "VAS server 150") and a network 160. The number of devices and/or networks, illustrated in FIG. 1, is provided for explanatory purposes only. In practice, there may be additional devices and/or networks, fewer devices and/or networks, different devices and/or networks, or differently arranged devices and/or networks than illustrated in FIG. 1.

Also, in some implementations, one or more of the devices of environment 100 may perform one or more functions described as being performed by another one or more of the devices of environment 100. For example, application server 120, workflow server 130, transaction server 140, and/or VAS server 150 may be integrated into a single device and/or system. Components of environment 100 may interconnect via wired connections, wireless connections, or a combination of wired and wireless connections.

Merchant equipment 110 may include any computation or communication device, such as a wireless communication device, that is capable of communicating with network 160. For example, merchant equipment 110 may include a radiotelephone, a personal communications system (PCS) terminal (e.g., such as a smart phone that may combine a cellular radiotelephone with data processing and data communications capabilities), a personal digital assistant (PDA) (e.g., that can include a radiotelephone, a pager, Internet/intranet access, etc.), a laptop computer, a tablet computer, a personal computer, or another type of computation or communication device. In one example implementation, merchant equipment 110 may include a global positioning satellite (GPS) component that communicates with a GPS constellation to obtain location information associated with merchant equipment 110.

Merchant equipment 110 may include a wireless vending module that receives payment information from a purchaser and is capable of communicating, with transaction server 140, to perform an electronic transaction using the payment information. Merchant equipment 110, in this example, may store goods (e.g., food, drinks, telephones, gift cards, etc.) that are dispensed to the purchaser as a result of the electronic transaction. Merchant equipment 110 may also, or alternatively, automatically select one or more value-added services to be performed, by a transaction service, when performing the electronic transaction.

Additionally, or alternatively, merchant equipment 110 may include a handheld device that is capable of accepting payment information (e.g., via credit card reader, etc.) in exchange for goods and/or services selected by an operator of merchant equipment 110. Merchant equipment 110, in this example, may place an order for the selected goods and/or services and may communicate with transaction server 140 to access the transaction service. Merchant equipment 110 and/or the operator may select one or more value-added services that are to be performed by the transaction service.

Additionally, or alternatively, merchant equipment 110 may be a vending dispatch device that receives payment information and/or selections of value-added services associated with a group of electronic transactions that are initiated by other merchant equipment 110. In this example, vending dispatch merchant equipment 110 (hereinafter referred to as "dispatch merchant equipment 110") may provide the payment information and/or selections of the value-added services to transaction server 140 to allow the transaction service to execute the group of electronic transactions.

Merchant equipment 110 may send a registration request to transaction server 140 that includes information associated with merchant equipment 110, such as a unique device identifier (e.g., a mobile directory number (MDN), a landline directory number (LDN), an electronic serial number (ESN), etc.), a network address (e.g., an Internet protocol (IP) address, a media access control (MAC) address, etc.), and/or information associated with an operator of merchant equipment 110 (e.g., a username, a password, a personal identification number (PIN), etc.). Merchant equipment 110 may receive, from transaction server 140, registration information that allows merchant equipment to access the transaction service, such as login credentials (e.g., username, password, PIN, etc.), a unique confirmation code, an access token, a public/private key pair, etc.

Financial server 115 may include one or more server devices, or other types of computation or communication devices, that gather, process, search, store, and/or provide information in a manner described herein. Financial server 115 may communicate via network 160. Financial server 115 may communicate with application server 120 to set up a transaction service that can be used by merchant equipment 110 to perform electronic transactions and/or to access one or more value-added services. Financial server 115 may receive a set up application that allows financial server 115 to specify a workflow to be used to perform an electronic transaction. Financial server 115 may use the set up application to identify which value-added services are to be offered when the transaction service is accessed by merchant equipment 110. The workflow may identify functions to be performed when the electronic transaction is performed and/or an order in which the functions are to be performed and/or in which the services are to be provided when performing the electronic transaction. Financial server 115 may upload set up information, to application server 120, that includes information associated with the workflow and/or value-added services to be offered in association with the transaction service.

Application server 120 may include one or more server devices, or other types of computation or communication devices, that gather, process, search, store, and/or provide information in a manner described herein. Application server 120 may communicate via network 160. Application server 120 may transmit a set up application to financial server 115 in response to a request received from merchant equipment 110. Application server 120 may receive set up information, from financial server 115, and may store the set up information in a memory associated with application server 120. Application server 120 may transmit a notification, to workflow server 130 and/or transaction server 140, that a transaction service, associated with financial server 115, is to be set up.

Workflow server 130 may include one or more server devices, or other types of computation or communication devices, that gather, process, search, store, and/or provide information in a manner described herein. Workflow server 130 may communicate via network 160. Workflow server 130 may receive a notification that merchant equipment 110 has initiated an electronic transaction to process payment information associated with financial server 115. The notification may identify which value-added services are selected by merchant equipment 110. Workflow server 130 may obtain, from application server 120, information associated with a workflow that corresponds to financial server 115. Workflow server 130 may execute the workflow by instructing VAS servers 150 to perform functions identified by the information associated with the workflow and/or to perform functions selected by merchant equipment 110. For example, workflow server 130 may instruct a first VAS server 150 to decrypt payment information, associated with the electronic transaction, when the notification indicates that merchant equipment 110 has specified that a decryption value-added service is to be performed. In another example, workflow server 130 may instruct a second VAS server 150 to collect metrics associated with the electronic transaction (e.g., information associated with a purchaser, types of goods and/or services purchased, a purchase history associated with a purchaser, an average purchase price based on the purchase history, etc.), when the notification indicates that merchant equipment 110 has specified that the metrics are to be collected.

Transaction server 140 may include one or more server devices, or other types of computation or communication devices, that gather, process, search, store, and/or provide information in a manner similar to that described herein. Transaction server 140 may communicate via network 160. In one example implementation, transaction server 140 may host a website associated with a transaction service, associated with financial server 115, that has been set up by application server 120. In another example, transaction server 115 may publish information associated with the transaction service, to network 160, that allows merchant equipment 110 to discover the service via network 160. The information associated with the transaction service may include an address (e.g., an IP address, a uniform resource locator (URL), a MAC address, etc.) to be used to access the transaction service.

Transaction server 140 may determine whether merchant equipment 110 is a trusted device and may register merchant equipment 110 based on a determination that merchant equipment 110 is a trusted device. Transaction server 140 may receive information associated with merchant equipment 110, such as a unique device identifier (e.g., a MDN, a LDN, an ESN, etc.), a device address (e.g., an IP address, a MAC address, etc.), and/or information associated with an operator (e.g., a username, password, PIN, etc.). Transaction server 140 may use the information associated with merchant equipment 110 to determine whether merchant equipment 110 is trusted a trusted device. Transaction server 140 may generate unique registration information, associated with merchant equipment 110, to be used to authenticate merchant equipment 110 during future electronic transactions. Transaction server 140 may transmit a registration notification (e.g., that includes the registration information) to merchant equipment 110.

Additionally, or alternatively, transaction server 110 may obtain context information, associated with merchant equipment 110, such as information associated with a location of merchant equipment 110, information associated with a type of merchant equipment 110, etc. Transaction server 110 may generate the registration information based on the context information and/or other information (e.g., such as a time at which merchant equipment 110 was registered, etc.).

Transaction server 140 may receive, from merchant equipment 110, a request to perform an electronic transaction and may authenticate merchant equipment 110 based on the registration information obtained from the request. Transaction server 140 may transmit, to workflow server 130 and/or application server 120, a notification that merchant equipment 110 has initiated an electronic transaction. The notification may include payment information and/or one or more value-added services to be provided when performing the electronic transaction.

VAS server 150 may include one or more server devices, or other types of computation or communication devices, that gather, process, search, store, and/or provide information in a manner similar to that described herein. VAS server 150 may, in response to an instruction from workflow server 130, provide a value-added service associated with an electronic transaction. The value-added service may, in one example, be provided by one VAS server 150. In another example, the value-added services may be provided by two or more VAS servers 150.

VAS server 150 may, for example, decrypt information associated with the electronic transaction (e.g., such as, payment information, information associated with a purchaser, etc.) in response to a first instruction from workflow server 130. VAS server 150 may, in response to a second instruction, update an inventory, associated with merchant equipment 110, based on a quantity of products and/or services being sold as a result of the electronic transaction. VAS server 150 may, in response to a third instruction, analyze electronic transactions, initiated by merchant equipment 110, to identify a quantity of products and/or services sold within a time period, an amount of revenue generated within the time period, whether traffic conditions (e.g., congestion, dropped packets, etc.) are associated with traffic received from merchant equipment 110, etc.

VAS server 150 may, in response to a fourth instruction, identify incentives (e.g., such as discounted prices, coupons, product and/or service offerings, etc.) that can be offered to the purchaser, via merchant equipment 110, based on products and/or services and/or a purchase history associated with the purchaser. VAS server 150 may identify greater incentives (e.g., deeper discounts, etc.) when a quantity of purchases and/or sales, associated with the purchaser, is greater than a threshold.

VAS server 150 may, in response to a fifth instruction, encrypt information associated with the electronic transaction (e.g., such as, a receipt associated with the electronic transaction, payment information, etc.). VAS server 150 may, in response to a sixth instruction, identify whether payment information is incorrect, out-of-date, potentially fraudulent, etc. VAS server 150 may also, or alternatively, determine whether information associated with a purchaser (e.g., name, billing address, etc.) is incorrect, out-of-date, etc.

Network 160 may include one or more wired and/or wireless networks. For example, network 160 may include a cellular network, a public land mobile network (PLMN), a second generation (2G) network, a third generation (3G) network, a fourth generation (4G) network (e.g., a long term evolution (LTE) network), a fifth generation (5G) network, and/or another network. Additionally, or alternatively, network 160 may include a wide area network (WAN), a metropolitan network (MAN), a telephone network (e.g., the Public Switched Telephone Network (PSTN)), an ad hoc network, an intranet, the Internet, a fiber optic-based network, and/or a combination of these or other types of networks.

Figure 2:
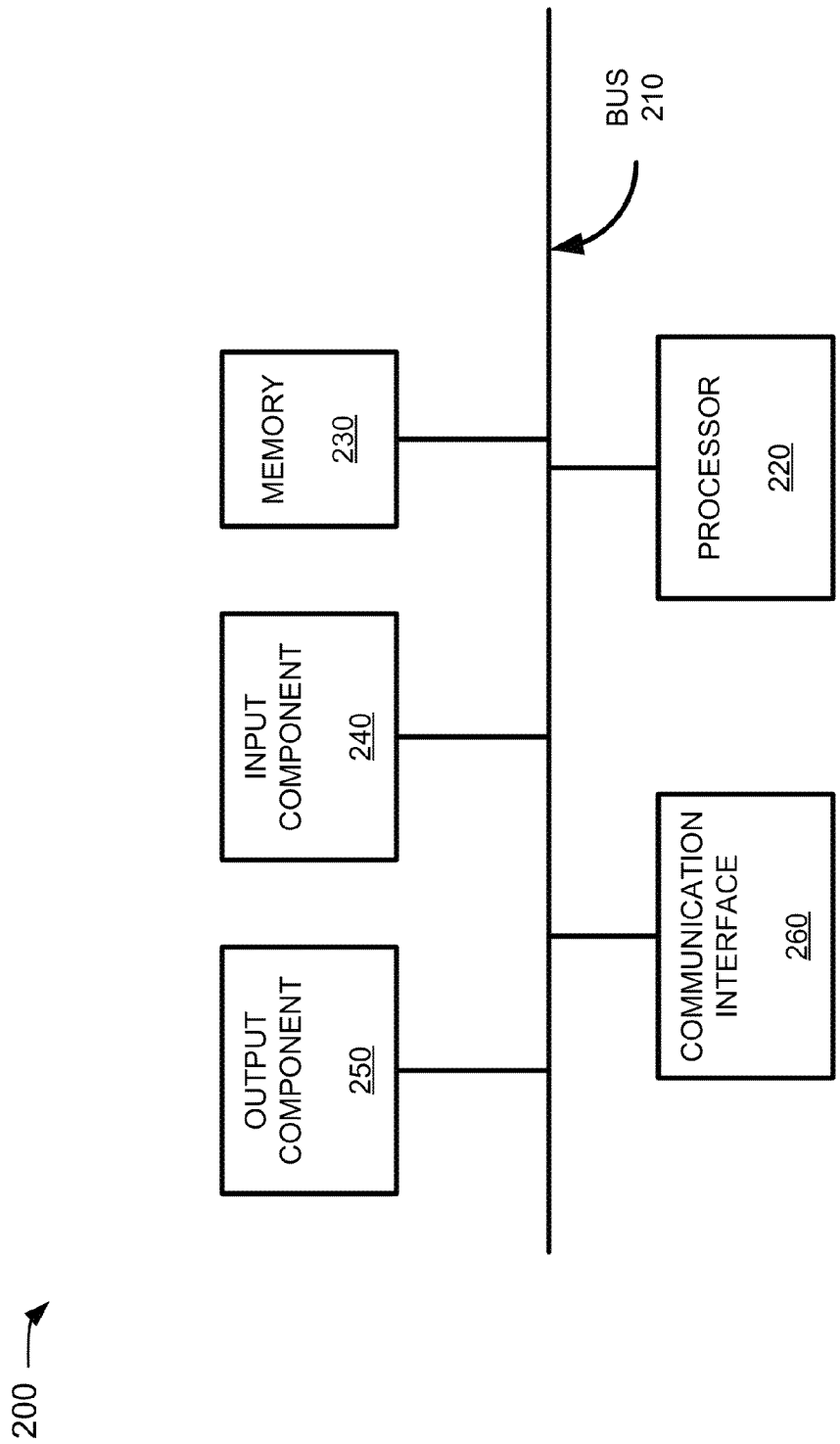
FIG. 2 is a diagram of example components of one or more of the devices of FIG. 1.

FIG. 2 is a diagram of example components of a device 200 that may correspond to merchant equipment 110, financial server 115, application server 120, workflow server 130, transaction server 140, and/or VAS server 150. Device 200 may include a bus 210, a processor 220, a memory 230, an input component 240, an output component 250, and a communication interface 260. Each of merchant equipment 110, financial server 115, application server 120, workflow server 130, transaction server 140, and/or VAS server 150 may include one or more devices 200 or one or more components of device 200.

Although FIG. 2 shows example components of device 200, in other implementations, device 200 may include fewer components, additional components, different components, or differently arranged components than depicted in FIG. 2. Additionally, or alternatively, in other implementations, one or more components of device 200 may perform one or more tasks described as being performed by one or more other components of device 200.

Bus 210 may include a path, or collection of paths, that permits communication among the components of device 200. Processor 220 may include a processor, microprocessor, or processing logic that may interpret and execute instructions. Memory 230 may include any type of dynamic storage device that may store information and instructions for execution by processor 220, and/or any type of non-volatile storage device that may store information for use by processor 220.

Input component 240 may include a mechanism that permits an operator to input information to device 200, such as a keyboard, a keypad, a button, a switch, a card reader, etc. In an example implementation, input component 240 may include a card reader that obtains payment information (e.g., a card number, a cardholder name, an expiration date, a name of a financial institution, etc.), from a credit card, debit card, etc. when the credit card, debit card, etc. is slid through the card reader. Output component 250 may include a mechanism that outputs information to the operator, such as a display, a speaker, one or more light emitting diodes (LEDs), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.) or a combination of wireless and wired communications. For example, communication interface 260 may include mechanisms for communicating with another device or system via a network, such as network 160.

As will be described in detail below, device 200 may perform operations relating to cloud-based electronic transaction services. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
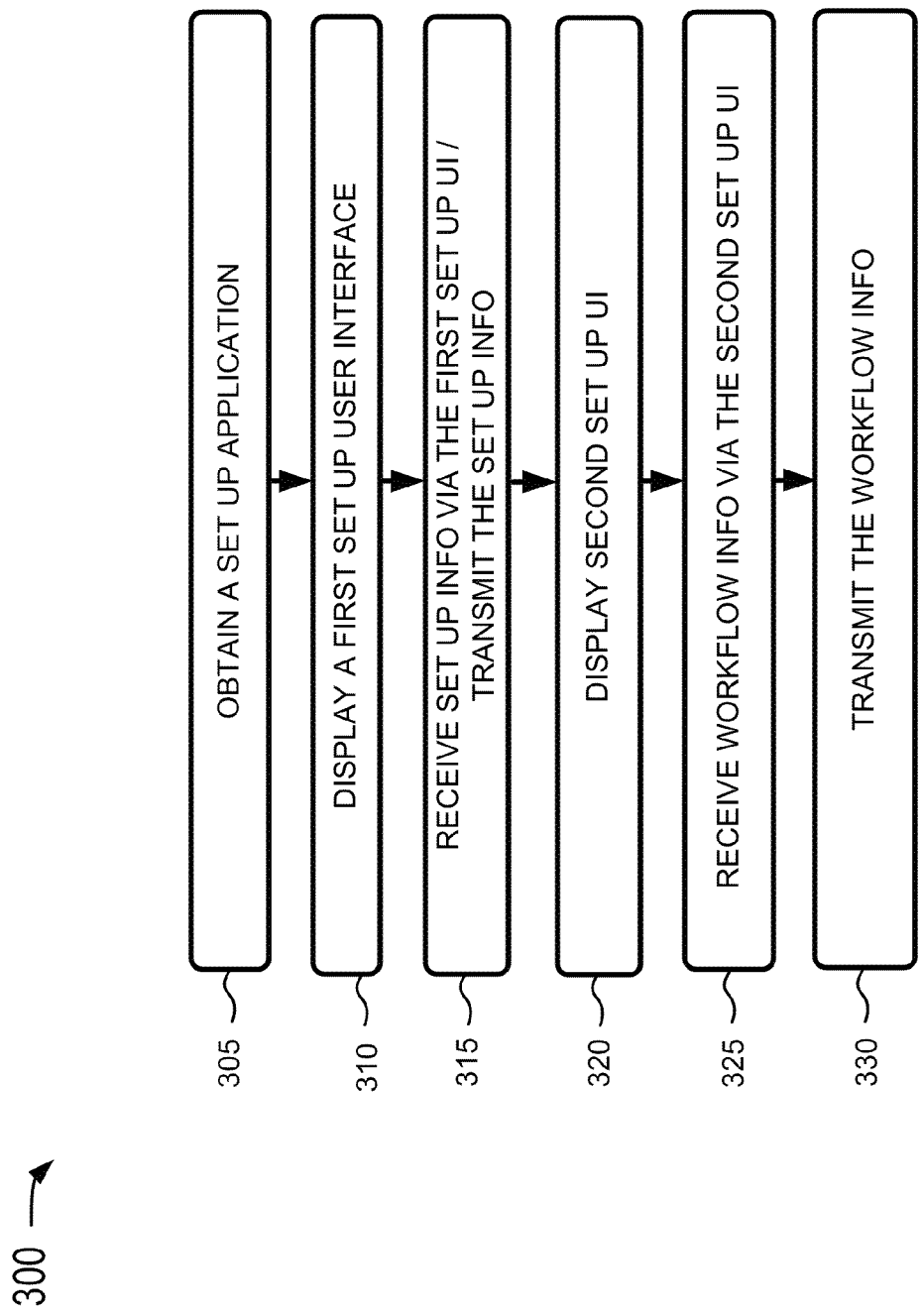
FIG. 3 is a flow chart of an example process for setting up a workflow to allow an electronic transaction to be performed according to an implementation described herein.
Figure 4:
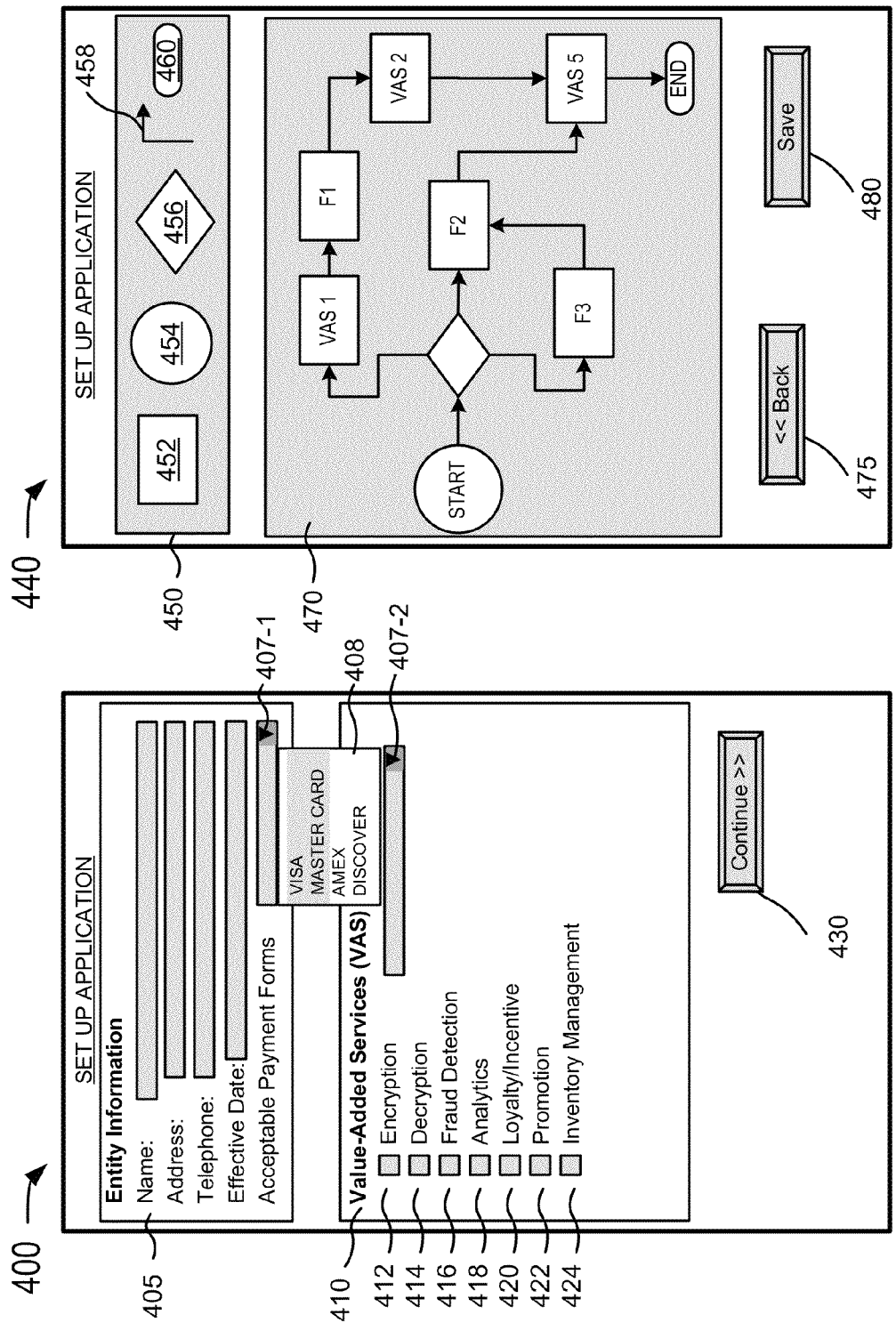
FIGS. 4A and 4B are diagrams of example set up user interfaces that are capable of being presented for display on the financial server of FIG. 1.

FIG. 3 is a flow chart of an example process 300 for setting up a workflow to allow an electronic transaction to be performed according to an implementation described herein. In one example implementation, process 300 may be performed by financial server 115. In another example implementation, some or all of process 300 may be performed by a device or a collection of devices separate from, or in combination with, financial server 115. FIGS. 4A and 4B are diagrams of example set up user interfaces 400 and 440 that are capable of being presented on the financial server of FIG. 1. A portion of process 300, of FIG. 3, will be described below with references to user interfaces 400 and 440 of FIGS. 4A and 4B, respectively.

As shown in FIG. 3, process 300 may include obtaining a set up application (block 305) and displaying a first set up user interface (block 310). For example, an operator, of financial server 115, may cause financial server 115 to obtain, from application server 120, a set up application. Financial server 115 may store the set up application, in a memory associated with financial server 115. Financial server 115 may execute the set up application, which may cause the set up application to present, on a display associated with financial server 115, a first set up user interface (e.g., set up user interface 400 of FIG. 4A).

As shown in FIG. 4A, set up user interface 400 may include an entity information field 405, a value-added services (VAS) field 410, and a continue button 430. User interface 400 may permit an operator, of financial server 115, to enter set up information to be used to generate a workflow to be used to perform an electronic transaction. A number of fields and/or buttons are shown in FIG. 4A for explanatory purposes. In another example implementation, there may be additional fields and/or buttons, fewer fields and/or buttons, different fields and/or buttons, or differently arranged fields and/or buttons than illustrated in FIG. 4A.

Entity information field 405 may permit an operator of financial server 115 to enter information pertaining to a financial institution (e.g., a bank, credit union, credit card processor, etc.) associated with financial server 115. For example, the operator may enter, into entity information field 405, a name, an address, and/or a telephone number associated with the financial institution. The operator may also enter, into entity information field 405, an effective date on which an electronic transaction may be performed using a workflow that is based on set up information. The operator may identify one or more forms of payment that may be authorized by financial server 115 by selecting pull down menu button 407-1 to display pull down menu 408. Pull down menu 408 may identify forms of payment accepted by financial server 115 (e.g., Visa, Master Card, American Express (AMEX), Discover, etc.). The operator may select one or more forms of payment, within pull down menu 408 (e.g., shown as shaded Visa and Master Card), to be processed when the workflow is executed (e.g., by workflow server 130).

VAS field 410 may permit the operator to identify value-added services to be included in the workflow associated with an electronic transaction. For example, the operator may cause one or more of the value-added services to be included in the workflow by selecting a box associated with an encryption service 412, a decryption service 414, a fraud detection service 416, an analytics service 418, a loyalty/incentive service 420, a promotion service 422 and/or an inventory management service 424. VAS field 410 includes fields 412-424 for explanatory purposes. In practice, VAS field 410 may include additional fields, fewer fields, different fields, and/or differently arranged fields than are described with respect to VAS field 410.

Encryption field 412 may permit the operator to associate an encryption service with the workflow that causes information associated with an electronic transaction (e.g., payment information, an electronic receipt, information associated with a purchaser, etc.) to be encrypted prior to transmitting the information associated with the electronic transaction over network 160. Encryption field 412 may be associated with a pull-down menu button 407-2 that allows the operator to select an encryption scheme from a pull down menu (not shown) of a list of encryption schemes (e.g., based on an Advanced Encryption Standard (AES), a data encryption standard (DES), a Blowfish algorithm, a Digital Signature Standard (DSS), public key infrastructure (PKI), etc.). Decryption field 414 may permit the operator to associate a decryption service with the workflow that causes payment information, received from merchant equipment 110, to be decrypted based on an encryption scheme used by merchant equipment 110 and/or that corresponds to the encryption scheme selected by the operator.

Fraud detection field 416 may permit the operator to associate a fraud detection service with the workflow that identifies incorrect payment information, expired payment information, and/or payment information that matches other payment information that is included on a list of fraudulent payment information. Analytics field 418 may permit the operator to associate an analytics service with the workflow that collects and/or analyzes metrics associated with the electronics sales transaction. The analytics service may, for example, enable information associated with merchant equipment 110 to be obtained, such as a quantity of electronic transactions associated with merchant equipment 110 within a time period, a quantity of revenue generated by merchant equipment 110 within the time period, a quantity of products and/or services sold by merchant equipment 110 within the time period, etc. The analytics service may also identify a purchase history associated with a purchaser, a period of time associated with the electronic transaction, a condition (e.g., congestion, dropped packets, etc.) associated with traffic that is transported to and/or from merchant equipment 110, etc.

Loyalty/incentive field 420 may permit the operator to associate a loyalty/incentive service with the workflow to identify incentives (e.g., such as discounted prices, coupons, product and/or service offerings, etc.) that can be offered to the purchaser, via merchant equipment 110, based on a purchase history associated with the purchaser. Promotion field 422 may permit the operator to associate a promotion service with the workflow to cause advertising content to be offered to the purchaser via merchant equipment 110. Inventory management field 424 may permit the operator to associate an inventory management service with the workflow to manage an inventory of products and/or services, associated with merchant equipment 110, as a result of electronic transactions to be performed. The inventory management service may track a quantity of a good and/or service that is sold, adjust an inventory associated with the product and/or service, send a notification when the quantity of the good and/or service is less than a threshold and/or is depleted, etc.

Continue button 430 may, when selected by the operator, cause the entity information and/or selection of the value-added services to be transmitted to application server 120.

Returning to FIG. 3, process 300 may include receiving set up information via the first set up user interface and transmitting the set up information (block 315), and displaying a second set up user interface (block 320). For example, financial server 115 may receive set up information, via set up user interface 400 (FIG. 4A), when the operator enters entity information into entity information field 405 (FIG. 4A) and/or specifies value-added services, to be associated with a workflow, by selecting one or more boxes associated with value-added services field 410 (FIG. 4A). The operator may select continue button 430 (FIG. 4A), which may cause financial server 115 to transmit the set up information to application server 120. Application server 120 may receive the set up information and may store the set up information in a memory associated with application server 120.

The set up application may present, for display on financial server 115, a second set up user interface (e.g., set up user interface 440 of FIG. 4B). As shown in FIG. 4B, set up user interface 440 may include a collection of data items and/or buttons, such as a workflow tools data item 450, a workflow design data item 470 (hereinafter referred to as "design data item 470," a back button 475, and a save button 480. Set up user interface 440 may permit the operator to design a workflow, associated with an electronic transaction, that is based on the set up information. A number of data items and/or buttons are shown in FIG. 4B for explanatory purposes. In another example implementation, there may be additional data items and/or buttons, fewer data items and/or buttons, different data items and/or buttons, or differently arranged data items and/or buttons than illustrated in FIG. 4B.

Workflow tools data item 450 may include a collection of workflow tools, such as a function data item 452, a start data item 454, a decision data item 456, a connector data item 458, and an end data item 460. Function data item 452 may represent a service or function associated with the workflow. In one example, function data item 452 may logically represent a value-added service that was selected, by the operator, to be associated with the workflow. In another example, function data item 452 may logically represent a function, associated with the workflow that is not associated with selected value-added services. The function may, for example, include processing payment information, authenticating merchant equipment 110, publishing web services (e.g., accessible by merchant equipment 110) associated with the workflow, etc.

Start data item 454 may logically represent a starting point associated with the workflow. Decision data item 456 may logically represent a decision point associated with the workflow. For example, when a condition is satisfied (e.g., merchant equipment 110 has been verified as a trusted device), then decision data item 456 may cause a first logical path to be executed, which may cause a first function to be performed and/or a first value-added service to be provided that correspond to function data item 452. In another example, when the condition is not satisfied (e.g., merchant equipment 110 has not been verified as a trusted device), then decision data item 456 may cause a second logical path to be executed, which may cause a second function to be performed and/or a second value-added service to be provided that correspond to another function data item 452.

Connector data item 458 may logically connect other tool data items and/or may identify a logical direction of the workflow (e.g., based on the direction of an arrow associated with connector data item 458) between each of the other tool data items. End data item 460 may logically represent an ending point associated with the workflow.

Design data item 470 may include an area into which an operator, of financial server 115, can move tool data items to create a logical representation of a workflow. The operator may, for example, arrange and/or interconnect tool data items, within design data item 470, to identify an order in which value-added services and/or electronic transaction functions are to be performed when the workflow is executed (e.g., by workflow server 130). Back button 475 may, when selected by the operator, cause the first set up user interface (e.g., set up user interface 400 of FIG. 4A) to be presented for display, on a display associated with financial server 115. The operator may edit set up information that was previously entered via the first set up user interface. Save button 480 may, when selected by the operator, cause information associated with the workflow, identified within design data item 470, to be transmitted to application server 120.

Returning to FIG. 3, process 300 may include receiving workflow information via the second set up user interface (block 325) and transmitting the workflow information (block 330). For example, the operator, of financial server 115, may select, via workflow data item 450, one or more workflow tools and may move (e.g., using a pointing device, etc.) the workflow tools to design data item 470. The operator may select a respective function data item 452 to represent each value-added service (e.g., shown as VAS 1, VAS 2, and VAS 5) that was selected by the operator via the first set up user interface and/or each function to be performed when an electronic transaction is executed (e.g., shown as F1, F2, and F3).

The operator may select and/or move, to design data item 470, start data item 454 and/or end data item 460 to represent a point at which the workflow starts and/or ends, respectively. The operator may select and/or move, to design data item 470, one or more connector data items 458 and/or may use connector data items 458 to logically interconnect start data item 454, function data items 452 and/or end data item 460 to create the workflow. The operator may position and/or interconnect function data items 452 in an order in which the functions and/or value-added services are to be performed. The operator may select and/or move, to design data item 470, decision data item 456 and may position and/or interconnect decision data item 456 in a manner that causes the functions and/or value-added services to be performed based on whether a condition, associated with decision data item 456 has been satisfied.

The operator may select save button 480, which may cause financial server 115 to transmit information associated with the workflow, created within design data item 470, to application server 120. The information associated with the workflow may identify the workflow tools that correspond to the functions and/or value-added services associated with the workflow. The information associated with the workflow may also identify workflow tools that identify a manner in which the functions and/or value-added services are logically interconnected. The information, associated with the workflow, may include information associated with financial server 115, such as a device identifier, a network address (an IP address, a MAC address, etc.), information associated with a financial institution (e.g., a name, an identifier, etc.). Application server 120 may receive the information associated with the workflow and may store the information, associated with the workflow, in a memory associated with application server 120.

Figure 5:
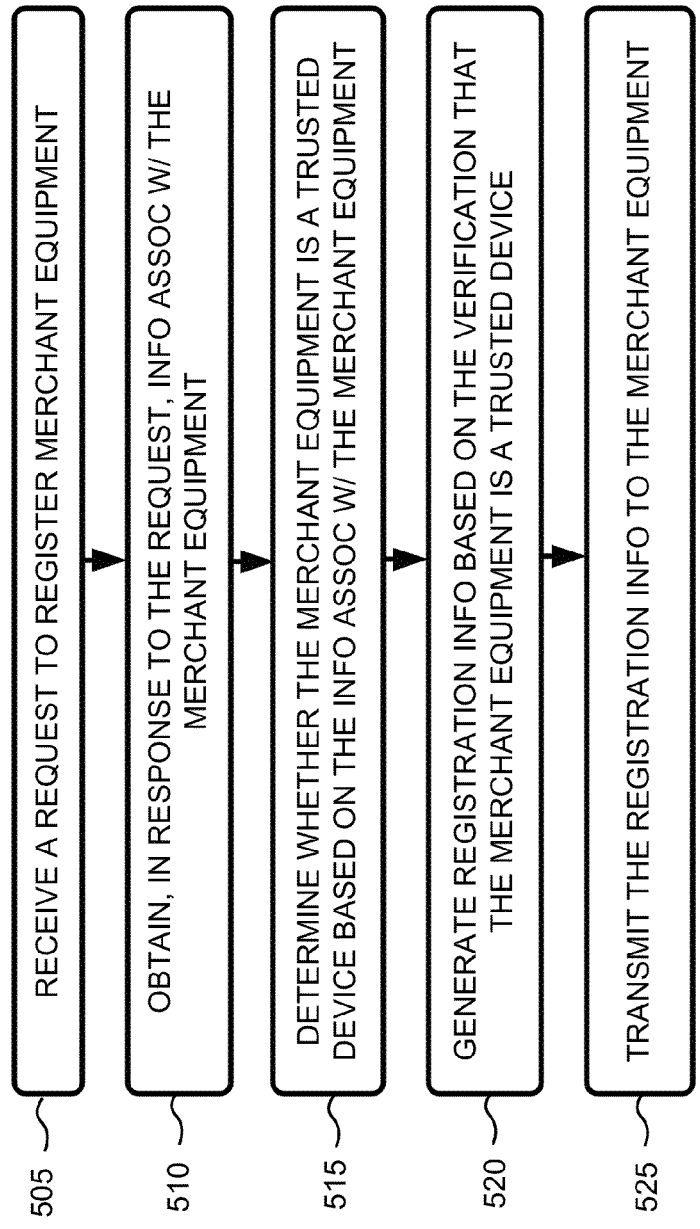
FIG. 5 is a flow chart of an example process for registering a merchant user device to perform an electronic transaction according to an implementation described herein.

FIG. 5 is a flow chart of an example process 500 for registering merchant user device 110 to perform an electronic transaction according to an implementation described herein. In one example implementation, process 500 may be performed by transaction server 140. In another example implementation, some or all of process 500 may be performed by a device or a collection of devices separate from, or in combination with, transaction server 140.

As shown in FIG. 5, process 500 may include receiving a request to register merchant equipment (block 505) and obtaining, in response to the request, information associated with the merchant equipment (block 510). For example, an operator of merchant equipment 110 may cause merchant equipment 110 to transmit, to transaction server 140, a request to register merchant equipment 110. Transaction server 140 may receive the request and may communicate with merchant equipment 110 to obtain information associated with merchant equipment 110. The information, associated with merchant equipment 110, may include a unique device identifier (e.g., a MDN, a LDN, an ESN, etc.), a network address (e.g., an IP address, a MAC address, etc.) and/or information associated with an operator of merchant equipment 110 (e.g., a username, password, PIN, etc.). Merchant equipment 110 may receive registration credentials that allows merchant equipment 110 to access the transaction service, such as login credentials (e.g., username, password, PIN, etc.), a unique confirmation code, an access token, a public/private key pair, etc.

As also shown in FIG. 5, process 500 may include determining whether the merchant equipment is a trusted device based on the information associated with the merchant equipment (block 515). For example, transaction server 140 may compare the information associated with merchant equipment 110 to other information associated with merchant equipment 110 stored in a memory associated with transaction server 140. In one example, transaction server 140 may determine that merchant equipment 110 is not a trusted device based on a determination that the information associated with merchant equipment 110 does not match the other information associated with merchant equipment 110 that is stored in the memory. Based on a determination that merchant equipment 110 is not a trusted device, transaction server 140 may not register merchant equipment 110.

In another example, transaction server 140 may determine that merchant equipment 110 is a trusted device based on a determination that the information associated with merchant equipment 110 matches the other information associated with merchant equipment 110 that is stored in the memory.

As further shown in FIG. 5, process 500 may include generating registration information based on a determination that the merchant equipment is a trusted device (block 520). For example, transaction server 140 may register merchant equipment 110 based on the determination that merchant equipment 110 is a trusted device. In one example, transaction server 140 may generate a unique registration number, associated with merchant equipment 110, that allows merchant equipment 110 to access a transaction service that is hosted by transaction server 140. Additionally, or alternatively, transaction server 140 may generate a key that merchant equipment 110 is to use to encrypt information associated with an electronic transaction (e.g., payment information, information associated with merchant equipment 110, information associated with products and/or services being purchased, etc.) and/or a copy of which may be used by workflow server 130, transaction server 140, and/or VAS server 150 to decrypt the information associated with the electronic transaction. The key may be generated, by transaction server 140, based on information associated with merchant equipment 110, a time at which merchant equipment 110 is registered, context information associated with merchant equipment 110 (e.g., information associated with a geographic location of merchant equipment 110, a cell via which merchant equipment 110 is communicating, etc.), etc.

As yet further shown in FIG. 5, process 500 may include transmitting the registration information to the merchant equipment (block 525). For example, transaction server 140 may transmit registration information, to merchant equipment 110, that allows merchant equipment 110 to access the transaction service. The registration information may include the unique registration number, the key, and/or other credentials that allow merchant equipment 110 to access the transaction service, to encrypt information associated with the electronic transaction, and/or to decrypt information received from transaction server 140. In another example, transaction server 140 may generate an access token that includes the registration information and which allows, merchant equipment 110 to access the transaction service, to encrypt information associated with the electronic transaction, and/or to decrypt information received from transaction server 140. Transaction server 140 may store the registration information and/or the token in a memory associated with transaction server 140.

Figure 6:
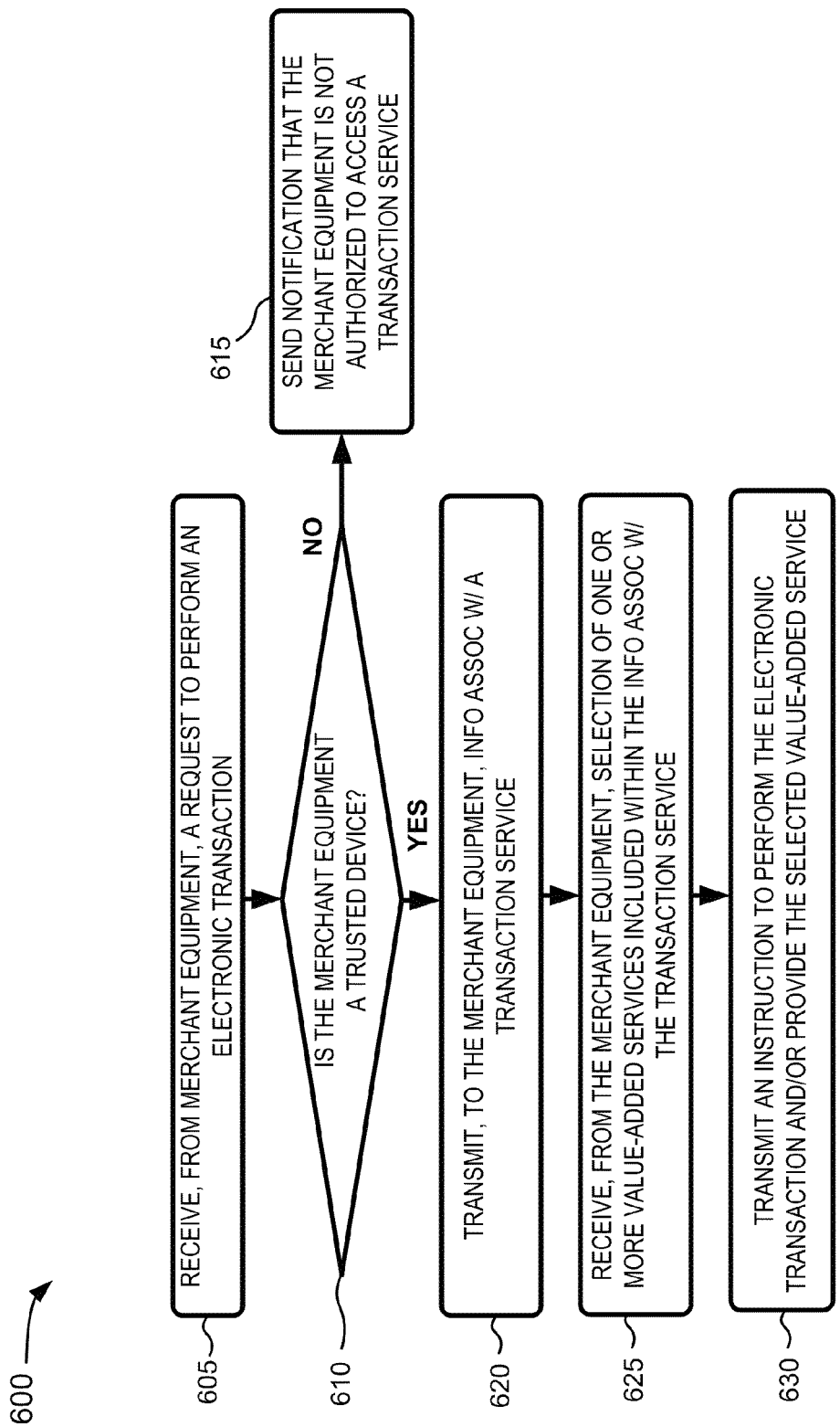
FIG. 6 is a flow chart of an example process for determining whether merchant user equipment is a trusted device that can receive an electronic transaction service according to an implementation described herein.

FIG. 6 is a flow chart of an example process 600 for performing an electronic transaction and/or providing a value-added service according to an implementation described herein. In one example implementation, process 600 may be performed by transaction server 140. In another example implementation, some or all of process 600 may be performed by a device or a collection of devices separate from, or in combination with, transaction server 140.

As shown in FIG. 6, process 600 may include receiving, from merchant equipment, a request to perform an electronic transaction (block 605). For example, merchant equipment 110 may receive, from a purchaser, a request to purchase a good and/or service. The request may include payment information (e.g., a credit card number, a debit card number, information associated with financial server 115 from which the credit card and/or debit card was issued, an expiration date, a billing address associated with the purchaser, etc.) and/or information that identifies the product and/or service to be purchased by the purchaser. Merchant equipment 110 may, in response to the request, transmit another request, to transaction server 140, to perform an electronic transaction. The other request to perform the electronic transaction may include registration information associated with merchant equipment 110. The registration information may, in a manner similar to that described above with respect to FIG. 5, include a unique registration number, information associated with merchant equipment 110, and/or other credentials that allow merchant equipment 110 to access a transaction service to perform the electronic transaction. In another example, the registration information may be received in the form of an access token.

Transaction server 140 may receive the request to perform the electronic transaction and may, in response to the request, determine whether merchant equipment 110 is a trusted device by comparing the registration information to other registration information stored in a memory associated with transaction server 140.

If the merchant equipment is not a trusted device (block 610-NO), then process 600 may include sending a notification that the merchant equipment is not authorized to access a transaction service (block 615). For example, transaction server 140 may determine that the registration information does not match the other registration information, stored in the memory, based on the comparison of the registration information to the other registration information. Transaction server 140 may determine that merchant equipment 110 is not a trusted device based on the determination that the registration information does not match the other registration information stored in the memory. Based on the determination that merchant equipment 110 is not a trusted device, transaction server 140 may transmit, to merchant equipment 110, a notification that merchant equipment 110 is not authorized to access the transaction service.

If the merchant equipment is a trusted device (block 610-YES), then process 600 may include transmitting, to the merchant equipment, information associated with the transaction service (block 620). For example, transaction server 140 may determine that merchant equipment 110 is a trusted device based on a determination that the registration information matches the other registration information stored in the memory. Based on the determination that merchant equipment 110 is a trusted device, transaction server 140 may authorize merchant equipment 110 to access to the transaction service. Transaction server 140 may, for example, transmit information, associated with the transaction service, to merchant equipment 110 and/or may allow merchant equipment 110 to access a web service (e.g., via a webpage, etc.) that provides the information associated with the transaction service. The information associated with the transaction service may include a list of one or more value-added services from which merchant equipment 110 may select to be performed in addition, or as an alternative, to the electronic transaction.

In one example, transaction server 140 may retrieve, from application server 120, set up information, associated with financial server 115, that identifies which value-added services are to be offered, to merchant equipment 110, as part of the transaction service. Transaction server 140 may include the identified value-added-services in the list of the value-added services to be accessed by merchant equipment 110.

As also shown in FIG. 6, process 600 may include receiving, from the merchant equipment, selection of one or more value-added services that is identified by the information associated with the transaction service (block 625) and transmitting an instruction to perform the electronic transaction and/or provide the selected value-added service (block 630). For example, merchant equipment 110, or an operator of merchant equipment 110, may select a value-added service, from the list of a value-added services and merchant equipment 110 may transmit the selection of the value-added service to transaction server 140. Transaction server 140 may receive the selection of the value-added service and may transmit an instruction, to workflow server 130, to perform an electronic transaction. The instruction may include the information associated with the electronic transaction, the registration information and/or access token, and/or the selection of the value-added service.

Figure 7:
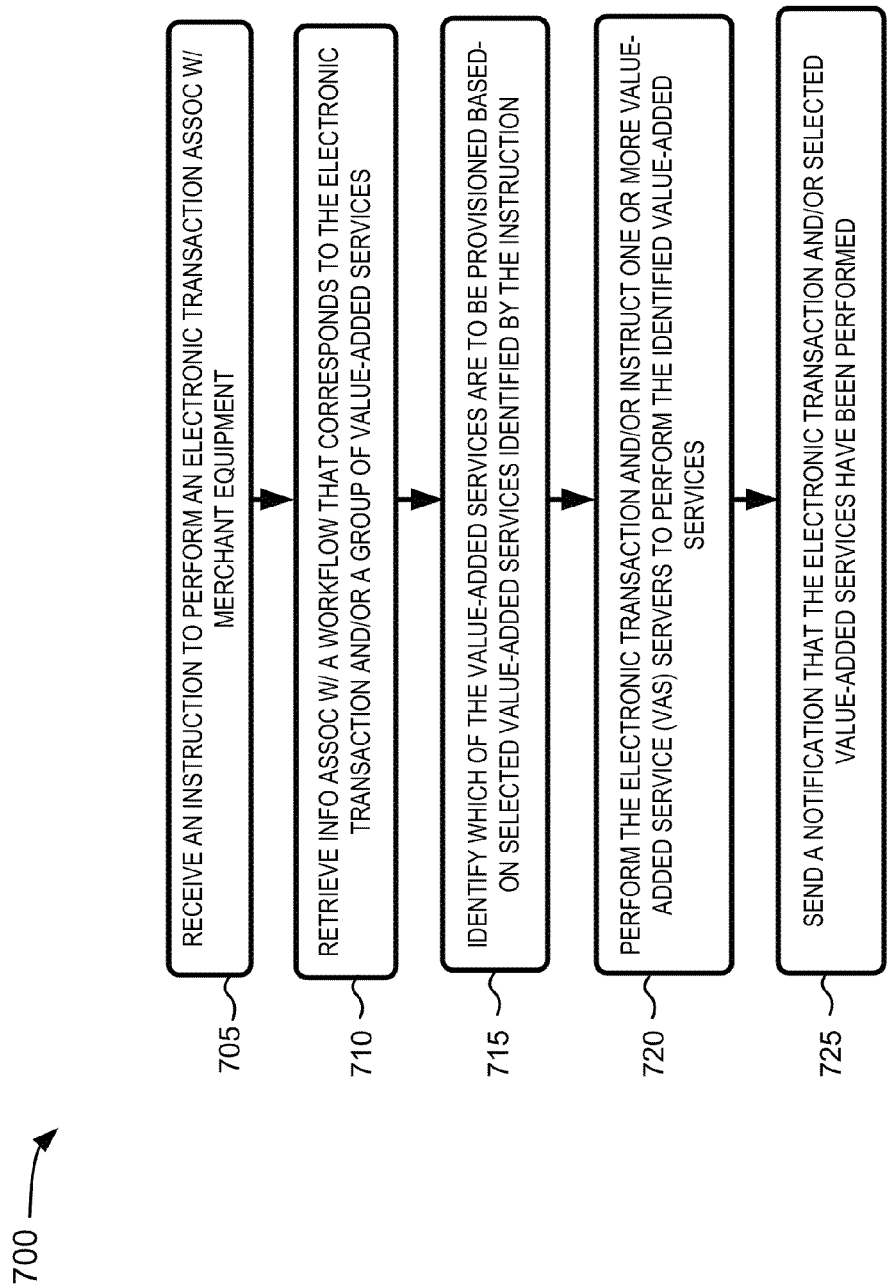
FIG. 7 is a flow chart of an example process for performing an electronic transaction and/or provisioning a value-added service according to an implementation described herein.

FIG. 7 is a flow chart of an example process 700 for performing an electronic transaction and/or provisioning a value-added service according to an implementation described herein. In one example implementation, process 700 may be performed by workflow server 130. In another example implementation, some or all of process 700 may be performed by a device or a collection of devices separate from, or in combination with, workflow server 130.

As shown in FIG. 7, process 700 may include receiving an instruction to perform an electronic transaction associated with merchant equipment (block 705) and retrieving information associated with a workflow that corresponds to the electronic transaction (block 710). For example, workflow server 130 may receive, from transaction server 140, an instruction to perform an electronic transaction associated with merchant equipment 110. The instruction may include information associated with the electronic transaction (e.g., payment information, information that identifies a product and/or service to be purchased, etc.), registration information associated with merchant equipment 110, and/or selection of a value-added service to be performed when the electronic transaction is executed.

Workflow server 130 may obtain, from the payment information, information that identifies with which financial server 115 the electronic transaction is associated. In one example, workflow server 130 may use a key, obtained from the instruction, to decrypt all or a portion of the payment information and/or to identify financial server 115 based on the decrypted payment information. The key may correspond to a key that was transmitted to merchant equipment 110 during a registration operation in a manner similar to that described above with respect to FIG. 3.

Workflow server 130 may retrieve, from application server 120, information associated with a workflow that corresponds to financial server 115. The information associated with the workflow may identify a manner in which one or more functions are to be performed to execute the electronic transaction. The information, associated with the workflow, may also identify a logical manner in which all or a portion of one or more value-added services, specified by financial server 115, are to be provisioned.

As also shown in FIG. 7, process 700 may include identifying which of the value-added services are to be provisioned based on the selected value-added services identified by the instruction (block 715) and performing the electronic transaction and/or instructing one or more VAS servers to perform the selected value-added services (block 720). For example, workflow server 130 may use information, associated with the selected value-added services, to identify which of the value-added services, identified by the information associated with the workflow, are to be provisioned. Workflow server 130 may retrieve, from a memory associated with workflow server 130, information associated with VAS servers 150 that perform the value-added services. Workflow server 130 may identify, from the information associated with VAS servers 150, one or more VAS servers 150 that perform the identified value-added services. Workflow server 130 may obtain, from the information associated with VAS servers 150, network addresses associated with the identified VAS servers 150. Workflow server 130 may use the network addresses to instruct each of the identified VAS servers 150 to perform a respective identified value-added service.

Workflow server 130 may instruct each of the VAS servers 150 to perform a respective identified value-added service in a manner that is specified by the information associated with the workflow. In one example, workflow server 130 may determine, based on the information associated with the workflow, that a first value-added service corresponds to a decryption service. Workflow server 130 may transmit a first instruction, to a first VAS server 150, to perform a decryption operation on all or a portion of the information associated with the electronic transaction. The instruction may include a copy of the key that was provided to merchant equipment 110 during a registration operation (e.g., in a manner described above with respect to FIG. 3). The first VAS server 150 may receive the first instruction and may use the copy of the key to decrypt the information associated with the electronic transaction and may transmit the decrypted information, associated with the electronic transaction, to workflow server 130.

Workflow server 130 may determine that another one of the respective identified value-added services are to be performed. Workflow server 130 may determine, for example, that a second value-added service corresponds to a fraud detection service. Workflow server 130 may transmit a second instruction, to a second VAS server 150 to perform a fraud detection operation on all or a portion of the information associated with the electronic transaction. The second VAS server 150 may receive the second instruction and may use the information associated with the electronic transaction to determine whether incorrect, out-of-date and/or fraudulent payment information is being used to purchase the product and/or service identified by the information associated with the electronic transaction. The fraudulent payment information may, in another example, be associated with a purchaser that is not authorized to use a credit card, debit card, etc., with which the payment information is associated. The second VAS server 150 may transmit a notification that identifies whether the payment information is potentially fraudulent payment information. Workflow server 130 may terminate the electronic transaction based on a determination that the payment information is potentially fraudulent payment information.

Workflow server 130 may send other instructions to other VAS servers 150 to perform other value-added services (e.g., encryption, analytics, inventory management, etc.) that were selected by merchant equipment 110 in a manner similar to that described in FIG. 5.

Workflow server 130 may, based on the information associated with the workflow, perform one or more functions associated with the electronic transaction, such as processing the payment information, transmitting a notification to merchant equipment 110 that the payment information has been processed, etc. In another example, workflow server 130 may communicate with financial server 115 and/or another network device to perform the functions associated with the electronic transaction.

As further shown in FIG. 7, process 700 may include sending a notification that the electronic transaction has been performed and/or that the value-added services have been provided (block 725). For example, workflow server 130 may transmit, to merchant equipment 110 and via transaction server 140, a notification indicating that the electronic transaction has been performed and/or that the payment information has been processed. The notification may identify a respective quantity of each good and/or service that was sold, a respective price associated with each good and/or service, an amount of tax and/or fees assessed as a result of the electronic transaction, etc.

Additionally, or alternatively, workflow server 130 may transmit information that indicates that the selected value-added services have been performed. In one example, workflow server 130 may transmit a notification that identifies whether the payment information was fraudulent when one of the selected value-added services includes a fraud detection service. In another example, workflow server 130 may transmit a notification that identifies how an inventory, associated with a product and/or service that was sold as a result of the electronic transaction, is affected when one of the selected value-added services includes an inventory management service. Workflow server 130 may transmit other notifications that are associated with other selected value-added services.

Figure 8:
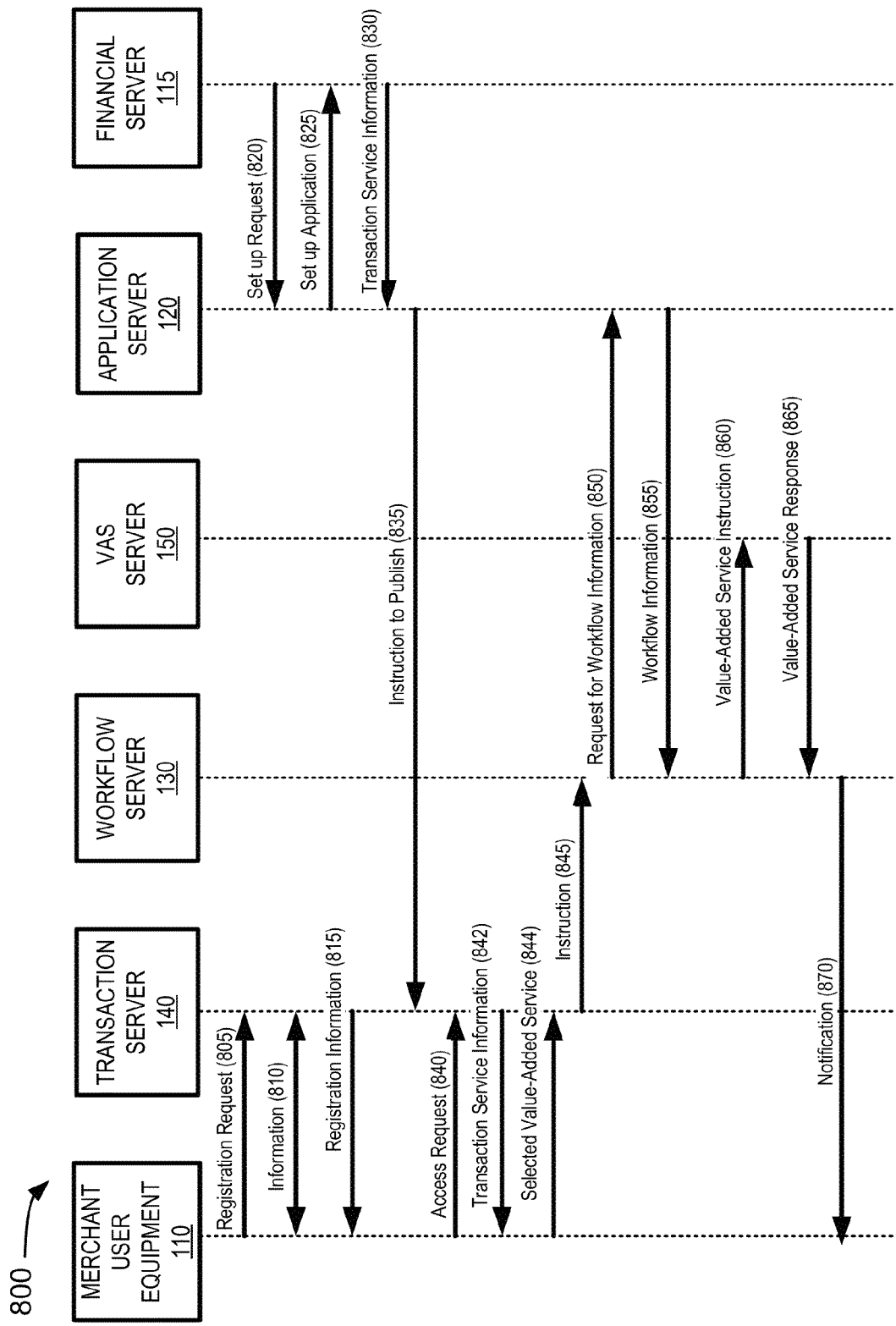
FIG. 8 is a diagram of example interactions for registering merchant equipment, setting up a workflow, and performing an electronic transaction between devices of FIG. 1 according to an implementation described herein.

FIG. 8 is a diagram of example interactions for registering merchant equipment 110, setting up a workflow, and performing an electronic transaction between devices of an example portion 800 of environment 100. As illustrated in FIG. 8, example environment portion 800 may include merchant equipment 110, financial server 115, application server 120, workflow server 130, transaction server 140, and VAS server 150. Merchant equipment 110, financial server 115, application server 120, workflow server 130, transaction server 140, and VAS server 150 may include the features described above in connection with one or more of FIGS. 1 and 2.

As shown in FIG. 8, merchant equipment 110 may transmit a registration request 805 to transaction server 140. Transaction server 140 may receive registration request 805 and may communicate with merchant equipment 110 to obtain information 810 from merchant equipment 110. Information 810 may correspond to information associated with merchant equipment 110. Transaction server 140 may, in a manner similar to that described above with respect to block 515 of FIG. 5, determine whether merchant equipment 110 is a trusted device based on information 810. Based on a determination that merchant equipment is a trusted device, transaction server 140 may, in a manner similar to that described above with respect to blocks 520-525 of FIG. 5, generate unique registration information, associated with merchant equipment 110, and may transmit registration information 815 to merchant equipment 110.

As also shown in FIG. 8, financial server 115 may transmit a set up request 820 to application server 120. Application server 120 may receive set up request 820 and may transmit a set up application 825 to financial server 115. Financial server 115 may receive set up application 825 and may, in a manner similar to that described above with respect to blocks 310-320 of FIG. 3, use set up application 825 to specify one or more value-added services to be included in a workflow associated with a transaction service. Additionally, or alternatively, financial server 115 may use set up application 825 to create a workflow that identifies a manner in which one or more functions are to be performed when the electronic transaction is executed and/or the one or more value-added services are to be provided.

Financial server 115 may transmit transaction service information 830 to application server 120. Transaction service information 830 may identify the one or more value-added services and/or include information associated with the workflow. Application server 120 may receive transaction server information 830 and may transmit an instruction to publish 835 to transaction server 140. Transaction server 140 may receive instruction to publish 835 and may present information, associated with the one or more value-added services obtained from instruction to publish 835, for display via a web page and/or otherwise permit merchant equipment 110 to access the information associated with the one or more value-added services (e.g., as a web service).

As further shown in FIG. 8, merchant equipment 110 may transmit an access request 840 to transaction server 140. Transaction server 140 may receive access request 840 and may, in a manner similar to that described above with respect to block 610, verify that merchant equipment 110 is a trusted device. Transaction server 140 may, based on the verification that merchant equipment 110 is a trusted device, transmit transaction service information 842 to merchant equipment 110. Merchant equipment 110 may receive transaction service information 842 and may select a value-added service, from the one or more value-added services identified within transaction service information 842. Merchant equipment 110 may transmit selected value-added service 844 to transaction server 140.

Transaction server 140 may receive selected value-added service 844 and may transmit instruction 845, to workflow server 130, to perform an electronic transaction and/or to provide the selected value-added service. Workflow server 130 may receive instruction 845 and may transmit a request for workflow information 850 to application server 120. Application server 120 may receive request for workflow information 850 and may transmit workflow information 855 to workflow server 130. Workflow information 855 may identify a manner in which one or more functions are to be performed and/or the selected value-added service is to be provided. Workflow server 130 may receive workflow information 855 and may identify VAS server 150 that provides the selected value-added service.

Workflow server 130 may, in a manner that conforms to the workflow information, perform the one or more functions associated with the electronic transaction and/or may transmit a value-added service instruction 860 to VAS server 150. VAS server 150 may receive value-added service instruction 860 and may perform the selected value-added service. VAS server 150 may transmit value-added service response 865 to workflow server 130. Value-added service response 865 may include information that is generated as a result of providing the selected value-added service (e.g., a report on whether fraudulent payment information was detected, information associated with inventory management, etc.). Workflow server 130 may receive value-added service response 865 and may transmit notification 870 to merchant equipment 110 (e.g., via transaction server 140). Notification 870 may include an indication that the electronic transaction was performed and/or the information that is generated as the result of providing the selected value-added service. Merchant equipment 110 may receive notification 870.

A system and/or method, described herein, may enable a workflow, associated with an electronic transaction, to be established by a financial server. The workflow may identify a variety of functions to be performed when executing the electronic transaction and/or may identify one or more value-added services to be provided when selected by a merchant. The system and/or method may allow a transaction service to be provisioned, as a service (e.g., a cloud-based service, a web service, network-based service etc.), to merchant equipment. The system and/or method may allow the merchant equipment to access the transaction service to initiate an electronic transaction. The system and/or method may allow the merchant equipment and/or an operator of the merchant equipment to provide payment information and/or to specify one or more value-added services to be provided when the electronic transaction is performed.

The system and/or method may allow a workflow server, associated with the service provider network, to obtain, from the application server, the information associated with the workflow and/or to execute the workflow to process the payment information. The system and/or method may allow the workflow server to communicate with one or more VAS server devices to provide the value-added services that were specified by the operator of the merchant equipment. The system and/or method may allow the transaction service and/or value-added services to be provided to the merchant equipment without performing custom software development and/or without causing the merchant to replace the merchant equipment.

The foregoing description provides illustration and description, but is not intended to be exhaustive or to limit the implementations to the precise form disclosed. Modifications and variations are possible in light of the above teachings or may be acquired from practice of the embodiments.

While series of blocks have been described with regard to FIGS. 3 and 5-7, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Further, certain portions, described above, may be implemented as a component or logic that performs one or more functions. A component or logic, as used herein, may include hardware, such as a processor, an application-specific integrated circuit (ASIC), or a field-programmable gate array (FPGA), or a combination of hardware and software (e.g., a processor executing software).

It should be emphasized that the terms comprises and comprising, when used in this specification, are taken to specify the presence of stated features, integers, steps or components but do not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by a first server device, a request to perform an electronic transaction associated with merchant equipment, where the request identifies one or more value-added services that are to be provided when the electronic transaction is performed;

retrieving, from a memory associated with the first server device and in response to the request, workflow information, associated with a workflow that corresponds to the electronic transaction, where the workflow information identifies:

one or more functions, to be executed when the electronic transaction is to be performed, that are not associated with the one or more value-added services, wherein the one or more functions are not in a one-to-one correspondence with the one or more value-added services, and a manner in which the one or more value-added services are to be provided;

obtaining, by the first server device, information associated with one or more second server devices that provide the one or more value-added services;

instructing the one or more second server devices to provide the one or more value-added services, in a manner that conforms to the workflow information, based on the information associated with the one or more second server devices;

performing, by the first server device, the electronic transaction in a manner that conforms to the workflow information; and transmitting, to the merchant equipment, a notification that the electronic transaction has been performed or that the one or more value-added services have been provided.

2. The method of claim 1, where the one or more value-added services include at least one of:

a first service to provide advertising content to the merchant equipment, a second service to identify discounts to be offered to a purchaser, associated with the merchant equipment, based on a quantity of purchases made, by the purchaser, within a period of time, a third service to detect incorrect, out-of-date, or potentially fraudulent payment information, or a fourth service to manage an inventory associated with the merchant equipment as a result of a product or service being sold as a result of the electronic transaction.

3. The method of claim 1, further comprising:

obtaining, from the request, registration information associated with the merchant equipment, where the registration information uniquely identifies the merchant equipment;

determining whether the merchant equipment is a trusted device based on whether the registration information matches other registration information that is stored in the memory;

identifying the merchant equipment as a trusted device based on a determination that the registration information matches the other registration information; and processing the request based on the identification that the merchant equipment is a trusted device.

4. The method of claim 3, where processing the request further includes:

retrieving set up information, that corresponds to a third server device associated with a financial institution, where the set up information identifies a plurality of value-added services to be offered to the merchant equipment; and transmitting the set up information to the merchant equipment, where transmitting the set up information allows the merchant equipment to select the one or more value-added services, from the plurality of value-added services, to be provided when the electronic transaction is performed.

5. The method of claim 1, where obtaining the information associated with one or more second server devices further includes:

identifying one or more network addresses, associated with the one or more second server devices, based on the information associated with the one or more second server devices; and transmitting, to the one or more second server devices and using the one or more network addresses, the instructions to perform the one or more value-added services.

6. The method of claim 1, where the merchant equipment includes at least one of:

a computer device, a wireless vending module that stores goods and accepts payment information in exchange for a selected good that is dispensed to the purchaser as a result of performing the electronic transaction or providing the one or more value-added services, a handheld device that receives, from an operator of the handheld device, a selection of a good or service and accepts payment information in exchange for an order to be placed for the selected good or service as a result of the electronic transaction, or a vending dispatch device that receives one or more requests to perform one or more electronic transactions associated with one or more other merchant equipment.

7. The method of claim 1, where instructing the one or more second server devices to provide the one or more value-added services further includes:

identifying, based on the workflow information, a first value-added service, of the one or more value-added services, that is to be performed before any other value-added service of the one or more value-added services; and transmitting, to one of the one or more second server devices, a first instruction to provide the first value-added service, where the first instruction is transmitted before any other instruction to provide any of the other value-added services.

8. The method of claim 1, where performing the electronic transaction further includes:

performing the one or more functions in a manner that conforms to the workflow information.

9. The method of claim 1, wherein the one or more functions include at least one of:

a first function to authenticate the merchant equipment, a second function to process payment information received from the merchant equipment, or a third function to transmit a notification that indicates whether the electronic transaction has been performed.

10. The method of claim 1, further comprising:

receiving, from a third server device, a request to set up the workflow that corresponds to the electronic transaction;

transmitting a set up application to the third server device and in response to the request to set up the workflow, where the set up application identifies the one or more functions and a plurality of value-added services that can be included in the workflow; and receiving, from the third server device and as a result of transmitting the set up application, set up information that identifies at least the one or more value-added services, of the plurality of value-added services, that are to be included in the workflow.

11. The method of claim 10, further comprising:
receiving, from the third server device, the workflow information, where the workflow information includes a logical representation of an order in which the one or more functions are to be executed or at least the one or more value-added services are to be provided when performing the electronic transaction.

12. A first server device comprising:
a memory to store a workflow that identifies a manner in which one or more functions are to be executed when performing an electronic transaction and one or more services that are to be provided when requested by merchant equipment,
wherein the one or more services are not in a one-to-one correspondence with the one or more functions; and
one or more processors to:
receive, from the merchant equipment, a request to perform the electronic transaction,
where the request includes transaction information associated with the electronic transaction and identifies a service, of the one or more services, to be provided when performing the electronic transaction, identify, in response to the request, a second server device, of one or more second server devices, that provides the service,
where the one or more second server devices provide the one or more services,
identify an order in which the service is to be provided and the one or more functions are to be executed based on information associated with the workflow,
perform the electronic transaction based on the identified order,
wherein providing the service causes the transaction information to be transmitted, to the second server device, to allow the second server device to provide the service based on the transaction information, and transmit, to the merchant equipment, a notification that the electronic transaction has been performed or the service has been provided.

13. The server device of claim 12, where the transaction information includes at least one of:
payment information used to pay for one or more products or services for which the electronic transaction is being performed,
information associated with the merchant equipment,
information that identifies the one or more products or services,
information that identifies a quantity of the one or more products or services being purchased,
information that identifies a respective price associated with each of the one or more products or services, or
information that identifies taxes or fees associated with the electronic transaction.

14. The server device of claim 13, where at least one of the one or more processors is further to receive from the second server device:
a notification that adjusts an inventory, associated with the one or more products or services, based on the quantity of the one or more products or services, when the service corresponds to a service to track the inventory.

15. The server device of claim 12, where at least one of the one or more processors is further to:
receive, from a third server device, a request to set up the workflow,
transmit an application to the third server device in response to the request to set up the workflow,
where the application allows the third server device to select which of a plurality of services is to be included in the workflow, and
receive, from the third server device, a selection of the one or more services, of the plurality of services, to be included in the workflow.

16. The server device of claim 15, where the application allows the third server device to identify an order that the one or more functions are to be executed or the one or more services are to be provided, when performing the electronic transaction; and
where at least one of the one or more processors is further to:
receive the information, associated with the workflow, that identifies the order that the one or more functions are to be executed or the one or more services are to be provided, when performing the electronic transaction.

17. The server device of claim 15, where at least one of the one or more processors is further to:
publish the selection of the one or more services as a transaction service that can be accessed, by the merchant equipment, to perform the electronic transaction,
where publishing the selection of the one or more services as the transaction service allows at least one of:
the selection of the one or more services to be presented via a web page that can be accessed, by the merchant equipment, when the user equipment logs into the web page, or
the selection of the one or more services to be transmitted to the merchant equipment based on a determination that the merchant equipment is authorized to access the transaction service.

18. A system comprising:
a storage device to store workflow information that identifies a manner in which an electronic transaction is to be performed; and
one or more processors to:
receive, from merchant equipment, a request to access a transaction service that allows an electronic transaction to be performed,
transmit, to the merchant equipment and in response to the request, information associated with the transaction service that identifies:
a plurality of services that can be provided, by a plurality of server devices, when the electronic transaction is performed, and
one or more functions, to be executed when the electronic transaction is performed, that are not associated with the plurality of services,
wherein the plurality of services are not in a one-to-one correspondence with the one or more functions,
receive, from the merchant equipment, a selection of at least one service of the plurality of services,
identify at least one server device, of the plurality of server devices, that provides the at least one service,
perform the electronic transaction based on the workflow information,
where performing the electronic transaction includes:
executing the one or more functions, and
communicating with the at least one server device to cause the at least one service to be provided in a manner that conforms to the workflow information, and
transmit, to the merchant equipment, an indication that the electronic transaction has been performed, where the indication includes information obtained, from the at least one server device, as a result of the at least one service being performed.

19. The system of claim 18, where the at least one service corresponds to at least one of:
    a first service to provide advertising content to the merchant equipment,
    a second service to identify first incentives including a first level of discounts to be offered to a purchaser, associated with the merchant equipment, based on a first quantity of purchases made, by the purchaser, below a threshold amount within a period of time, or
    a third service to identify second incentives including a second level of discounts to be offered to the purchaser based on a second quantity of purchases made, by the purchaser, exceeding the threshold amount within the period of time.

20. The system of claim 1, where at least one of the one or more processors is further to:
    receive another request, from other merchant equipment, to access the transaction service,
    determine, in response to the other request, whether registration information, obtained from the other request, matches registration information stored in the storage device,
    transmit a notification, to the other merchant equipment, that indicates that the other merchant equipment is not authorized to access the transaction service when the registration information does not match the registration information stored in the storage device, and
    transmit, to the other merchant equipment, the information associated with the transaction service when the registration information matches the registration information stored in the storage device.

21. The system of claim 18, where at least one of the one or more processors is further to:
    retrieve, from the storage device, information associated with the plurality of server devices that identifies:
        a respective network address for each of the plurality of server devices, and
        a respective service, of the plurality of services, that is provided by each of the plurality of server devices, and identify the at least one server device, that provides the at least one service, based on the information associated with the plurality of server devices.

22. The system of claim 21, where at least one of the one or more processors is further to:
    obtain, from the information associated with the plurality of server devices, the respective network address associated with the at least one server device, and
    transmit, to the at least one server device and using the respective network address, an instruction to provide the at least one service.

* * * * *